(12) United States Patent
Zhang

(10) Patent No.: US 10,552,068 B2
(45) Date of Patent: Feb. 4, 2020

(54) ACCESS METHOD AND DEVICE FOR RANDOM ACCESS MEMORIES, CONTROL CHIP AND STORAGE MEDIUM

(71) Applicant: Sanechips Technology Co., Ltd., Shenzhen, Guangdong (CN)

(72) Inventor: Meng Zhang, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/571,189

(22) PCT Filed: Jun. 12, 2016

(86) PCT No.: PCT/CN2016/085501
§ 371 (c)(1),
(2) Date: Nov. 1, 2017

(87) PCT Pub. No.: WO2016/202222
PCT Pub. Date: Dec. 22, 2016

(65) Prior Publication Data
US 2018/0267727 A1 Sep. 20, 2018

(30) Foreign Application Priority Data
Jun. 17, 2015 (CN) .......................... 2015 1 0336814

(51) Int. Cl.
G06F 12/00 (2006.01)
G06F 3/06 (2006.01)
G06F 13/16 (2006.01)
(52) U.S. Cl.
CPC .............. *G06F 3/0629* (2013.01); *G06F 3/06* (2013.01); *G06F 3/061* (2013.01); *G06F 3/0638* (2013.01);
(Continued)

(58) Field of Classification Search
None
See application file for complete search history.

(56) References Cited

U.S. PATENT DOCUMENTS 5,283,882 A 2/1994 Smith
5,956,749 A 9/1999 Kakihara
(Continued)

FOREIGN PATENT DOCUMENTS

CN 1450457 A 10/2003
CN 1688135 A 10/2005
(Continued)

OTHER PUBLICATIONS

International Search Report in international application No. PCT/CN2016/085501, dated Sep. 18, 2016.
(Continued)

*Primary Examiner* — Baboucarr Faal
(74) *Attorney, Agent, or Firm* — Ling Wu; Stephen Yang; Ling and Yang Intellectual Property

(57) ABSTRACT

Disclosed are a device and method for accessing to a RAM and a control chip. The device includes a register module configured to acquire attribute information and startup information configured by a CPU and send the startup information to a searching and matching module, and also configured to store data information successfully matched by the searching and matching module and instruct the CPU to read the data information. The searching and matching module is configured to send address information to an RAM interface module according to the startup information, and also configured to acquire the data information sent by the RAM interface module, match the data information based on the attribute information in the register module and send the data information to the register module after matching is successful. The RAM interface module is configured to read the data information from the RAM based on the address (Continued)

information sent by the searching and matching module and send the data information to the searching and matching module.

9 Claims, 5 Drawing Sheets

(52) U.S. Cl.
CPC ........ G06F 3/0673 (2013.01); G06F 13/1668 (2013.01)

(56) References Cited

U.S. PATENT DOCUMENTS

| | | | |
|---|---|---|---|
| 6,701,432 B1* | 3/2004 | Deng | ............... H04L 29/06 713/153 |
| 6,772,347 B1 | 8/2004 | Xie | |
| 9,110,677 B2 | 8/2015 | Ravimohan et al. | |
| 2004/0158744 A1 | 8/2004 | Deng | |
| 2007/0288690 A1 | 12/2007 | Wang | |
| 2008/0147907 A1 | 6/2008 | Triece | |
| 2008/0209540 A1 | 8/2008 | Deng | |
| 2010/0281532 A1 | 11/2010 | Deng | |
| 2011/0040849 A1* | 2/2011 | Umezawa | ............... H04L 12/12 709/213 |
| 2014/0269718 A1 | 9/2014 | Goyal et al. | |
| 2014/0281458 A1 | 9/2014 | Ravimohan et al. | |
| 2016/0011998 A1 | 1/2016 | Triece et al. | |

FOREIGN PATENT DOCUMENTS

| | | |
|---|---|---|
| CN | 101651810 A | 2/2010 |
| CN | 102013274 A | 4/2011 |
| CN | 102608874 A | 7/2012 |
| CN | 102866963 A | 1/2013 |
| CN | 103677758 A | 3/2014 |
| CN | 104965676 A | 10/2015 |
| WO | 2014158991 A1 | 10/2014 |

OTHER PUBLICATIONS

English Translation of the Written Opinion of the International Search Authority in international application No. PCT/CN2016/085501, dated Sep. 18, 2016.

Supplementary European Search Report in European application No. 16810963.5, dated Feb. 28, 2018.

* cited by examiner

ACCESS METHOD AND DEVICE FOR RANDOM ACCESS MEMORIES, CONTROL CHIP AND STORAGE MEDIUM

TECHNICAL FIELD

The disclosure relates to communications, and more particularly, to a method and device for accessing to a Random-Access Memory (RAM), a control chip and a storage medium.

BACKGROUND

With the rapid development of a communication technology, a transmission rate of a network is developed to 100 Gb/s or even higher. While the transmission rate is increased, there is an increasingly higher demand on an access speed to a RAM. For example, a routing table in a router and a Media/Medium Access Control (MAC) address table in a switch are stored in respective RAMs of corresponding communication devices. In order to know information stored in a RAM in real time, it is required to access to the RAM by a Central Processing Unit (CPU) and then perform the analysis. In the existing communication device, the data transmission at 100 Gb/s or more is implemented by an Application Specific Integrated Circuit (ASIC) chip, while the RAM that stores such information as the routing table and the MAC address table is also positioned in this ASIC chip. In order to access to the RAM in the ASIC by the CPU, an interface is required. However, the bandwidth of the interface is not too wide, just between 10M and 200M.

In the related art, the conventional access process to the RAM includes the following steps. Instructions such as an accessed RAM number (RAM-ID) and an access address are written into a command register by the CPU. A logic circuit inside the ASIC reads data information in the RAM according to the instructions in the command register. After the read data information is stored to a data register, the CPU reads the data information in the data register. In order to obtain the information in the RAM according to such a way, at least ten or more ASIC clock cycles are required to obtain one piece of the data information in the RAM. Furthermore, in order to obtain the information having a certain attribute in the RAM, under the condition that a specific address of the information in the RAM is not known, all addresses of the RAM are required to be traversed once and then the information having this attribute is extracted from all information in the RAM. In such a way, more time will be consumed to access to the RAM and the efficiency is relatively low.

SUMMARY

To solve the related technical problems, the embodiments of the disclosure provide a method and device for accessing to a RAM, a control chip and a storage medium that can solve the problem of low access efficiency to the RAM.

The technical solutions of the embodiments of the disclosure are implemented as follows.

The embodiments of the disclosure provide a device for accessing to a RAM. The device includes a register module, a searching and matching module and a RAM interface module.

The register module is configured to acquire attribute information and startup information configured by a CPU and send the startup information to the searching and matching module, and also is configured to store data information successfully matched by the searching and matching module and instruct the CPU to read the data information.

The searching and matching module is configured to send address information to the RAM interface module according to the startup information, and also is configured to acquire the data information sent by the RAM interface module, match the data information based on the attribute information in the register module and send the data information to the register module after matching is successful.

The RAM interface module is configured to read the data information from RAM based on the address information sent by the searching and matching module and send the data information to the searching and matching module.

In the above solutions, the register module is configured to acquire the attribute information and the startup information configured by the CPU. The attribute information includes to-be-accessed address range information.

The searching and matching module is configured to send the address information to the RAM interface module in sequence from a start address to an end address based on the to-be-accessed address range information after receiving the startup information.

In the above solutions, the register module is configured to acquire the attribute information configured by the CPU. The attribute information includes an attribute parameter.

The searching and matching module is configured to match the data information based on the attribute parameter in the register module.

In the above solutions, the register module includes a configuration register, a data register and a state register.

The configuration register is configured to acquire the attribute information and the startup information about the configuration of the CPU and send the startup information to the searching and matching module.

The data register is configured to store the data information successfully matched by the searching and matching module.

The state register is configured to instruct the CPU to read the data information.

In the above solutions, the configuration register includes an attribute register and a startup register.

The attribute register is configured to acquire the attribute information configured by the CPU.

The startup register is configured to acquire the startup information configured by the CPU and send the startup information to the searching and matching module.

In the above solutions, the state register includes a single-data acquired state register, configured to instruct the CPU to read the data information by a high level when the data information successfully matched by the searching and matching module is stored to the data register.

In the above solutions, the state register further includes an all-data acquired state register, configured to instruct that the access to the RAM is ended when it is determined that the access to to-be-accessed data information is ended.

The embodiments of the disclosure further provide a method for accessing to the RAM. The method includes that attribute information and startup information configured by a CPU are acquired; the RAM is searched based on the startup information and the attribute information to acquire data information; and the data information is matched with the attribute information, and the CPU is instructed to read the data information after matching is successful.

In the above solutions, the attribute information includes to-be-accessed address range information and an attribute parameter.

The operation that the RAM is searched based on the startup information and the attribute information to acquire the data information includes the RAM is searched in sequence from a start address to an end address based on the address range information in the attribute information when the startup information configured by the CPU is received.

Correspondingly, the operation that the data information is matched with the attribute information includes that the data information is matched with the attribute parameter in the attribute information.

The embodiments of the disclosure further provide a control chip. The control chip includes a RAM as well as the device for accessing to the RAM according to any one of claims 1-7. The RAM is configured to store data information.

The embodiments of the disclosure further provide a storage medium. A computer program is stored in the storage medium. The computer program is configured to implement the method for accessing to the RAM.

According to the method and device for accessing to the RAM as well as the control chip provided by the embodiments of the disclosure, the data information in conformity with the attribute information is found internally through the device for accessing to the RAM, and the data information is stored to the data register in the access device. The CPU is only required to access to the register module (specifically, the state register and the data register in the register module) to directly read data in conformity with the attribute information, and the CPU is not required to traverse all data information in the RAM and then judge whether the data information meets the requirement of the attribute information. Therefore, the access time is greatly saved, and the access efficiency to the RAM is increased.

DETAILED DESCRIPTION

The disclosure will be further described below in detail with reference to accompanying drawings and specific embodiments.

Embodiment 1

Figure 1:
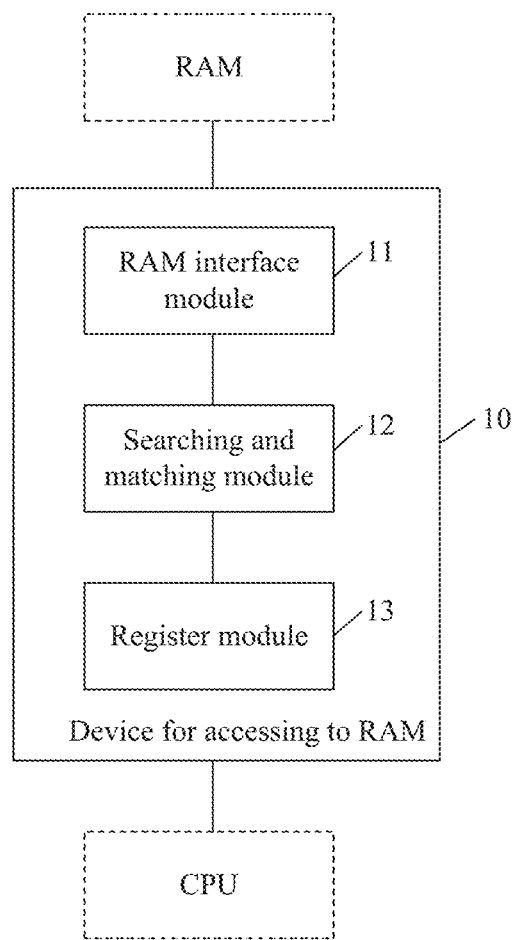
FIG. 1 is a first schematic structure diagram of a device for accessing to a RAM according to a first embodiment of the disclosure.

The embodiment of the disclosure provides a device for accessing to a RAM. FIG. 1 is a first schematic structure diagram of a device for accessing to a RAM according to a first embodiment of the disclosure. As shown in FIG. 1, the device includes a register module 13, a searching and matching module 12, and an RAM interface module 11.

The register module 13 is configured to acquire attribute information and startup information configured by a CPU and send the startup information to the searching and matching module 12, and also is used to store data information successfully matched by the searching and matching module 12 and instruct the CPU to read the data information.

The searching and matching module 12 is configured to send address information to the RAM interface module 11 according to the startup information, and also is configured to acquire the data information sent by the RAM interface module 11, match the data information based on the attribute information in the register module 13 and send the data information to the register module 13 after matching is successful.

The RAM interface module 11 is configured to read the data information from the RAM based on the address information sent by the searching and matching module 12 and send the data information to the searching and matching module 12.

Herein, the register module 13 is configured to acquire the attribute information and the startup information configured by the CPU. The attribute information includes to-be-accessed address range information. The searching and matching module 12 is used to send the address information to the RAM interface module 11 in sequence from a start address based on the to-be-accessed address range information after receiving the startup information.

Herein, the register module 13 is configured to acquire the attribute information configured by the CPU. The attribute information includes an attribute parameter. The searching and matching module 12 is configured to match the data information based on the attribute parameter in the register module 13.

In the embodiment, the register module 13 is mainly configured to acquire the attribute information and the startup information configured by the CPU. The CPU may instruct the device for accessing the RAM in the embodiment on how to operate by configuring the attribute information, such as configuring an attribute parameter for matching, configuring a to-be-accessed RAM identifier (specifically RAM number), and configuring to-be-accessed RAM address range information (including a start address and an end address). In other words, the attribute information may include the attribute parameter, the RAM identifier and the RAM address range information, etc. Herein, the to-be-accessed RAM address range falls into the address range of the RAM. Namely, when the address range of the RAM is greater or equal to 0 and is smaller than or equal to N (N is a positive integer), the to-be-accessed RAM address range is greater than or equal to a and is smaller than or equal to b, wherein a is greater than or equal to 0, b is smaller than or equal to N, and both a and b are the positive integer. It may be understood that, the CPU configures the to-be-accessed address range information according to the RAM address range information. Of course, the to-be-accessed address range information is selectable, that is, the attribute information configured by the CPU acquired by the register module 13 also may exclude the to-be-accessed address range information. When the attribute information excludes the to-be-accessed address range information, the searching and matching module sends the address information to the RAM interface module in sequence from an address 0 of the RAM to an address n (n characterizes a depth of the RAM) of the RAM. Furthermore, the CPU further may configure the startup information to instruct the device for accessing the RAM in the embodiment to start implementing data access. Here, it also may be understood that, the CPU sends a signal that characterizes to implement the data access to the register module 13. The register module 13 starts to implement a data access operation based on the signal. The register module 13 is also used to acquire the data information successfully matched by the searching and matching module 12 and instruct the CPU that it may implement data reading.

The searching and matching module 12 is configured to control addresses of the to-be-accessed RAM. Specifically, the searching and matching module 12 controls the RAM interface module 11 to read the data information from the corresponding RAM in sequence from the start address in the address range information based on the attribute information in the register module 13, specifically based on the address range information in the attribute information. After the data information of one piece of address information is read completely, the searching and matching module 12 enables an address value of the address information to add 1 to generate new address information, and sends the new address information to the RAM interface module 11 to continuously read the data information from the RAM until the data information corresponding to all address information in the address range information is read completely.

The RAM interface module 11 is mainly configured to access the RAM, access the RAM using the address information instructed by the searching and matching module 12 to acquire corresponding data information, and send the data information to the searching and matching module 12 to match.

In the embodiment, the searching and matching module 12 matches the data information based on the attribute information of the register module 13. Specifically, the searching and matching module 12 matches the data information based on the attribute parameter in the register module 13 according to a preset matching rule. Herein the preset matching rule includes whether to be equal to, smaller than or greater than the attribute parameter. The preset matching rule further may include whether to be equal to a preset threshold value after being operated according to a preset operational rule based on the attribute parameter.

Specifically, taken PORT=8 as an example of the attribute parameter, when the preset rule indicates to be equal to the attribute parameter, the PORT values of the matched data information are 8. When the preset rule indicates to be smaller than the attribute parameter, the PORT values of the matched data information are smaller than 8. Accordingly, when the preset rule indicates to be greater than the attribute parameter, the PORT values of the matched data information are greater than 8. When the preset rule indicates to be equal to the preset threshold value after being operated according to the preset operational rule based on the attribute parameter, it is assumed that the preset operational rule is a subtraction operation and the preset threshold value is 3, the PORT values of the matched data information are 5 or 11.

Figure 2:
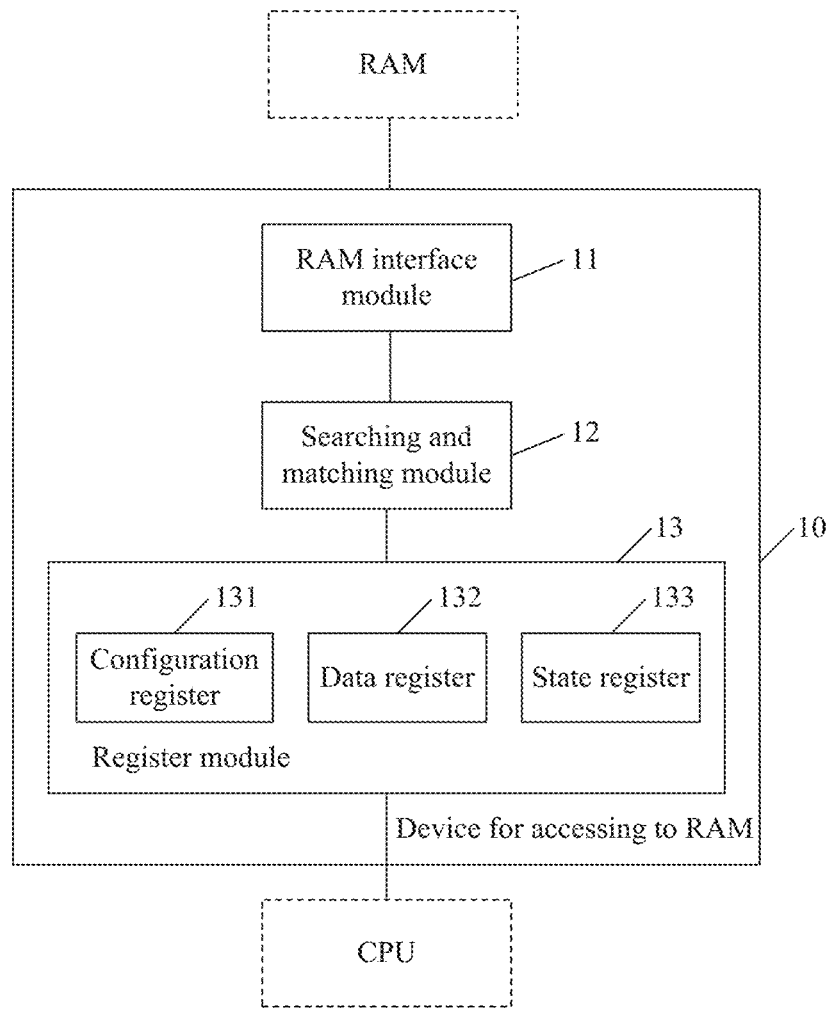
FIG. 2 is a second schematic structure diagram of a device for accessing to a RAM according to a first embodiment of the disclosure.

As an implementation mode, FIG. 2 is a second schematic structure diagram of a device for accessing to a RAM according to a first embodiment of the disclosure. As shown in FIG. 2, in the device for accessing to the RAM, the register module 13 includes a configuration register 131, a data register 132 and a state register 133.

The configuration register 131 is configured to acquire the attribute information and the startup information configured by the CPU and send the startup information to the searching and matching module 12.

The data register 132 is configured to store the data information successfully matched by the searching and matching module 12.

The state register 133 is configured to instruct the CPU to read the data information.

Specifically, the CPU may instruct the device for accessing the RAM in the embodiment on how to operate by configuring the attribute information, such as, configuring the attribute parameter(s) for matching, configuring to-be-accessed RAM identifier(s) (specifically RAM number(s)), and configuring to-be-accessed RAM address range information (including a start address and an end address). In other words, the attribute information may include the attribute parameter(s), the RAM identifier(s) and the RAM address range information, etc. In the implementation mode, the configuration register 141 is configured to store the attribute information. On the other hand, the CPU further may configure the startup information to instruct the device for accessing to the RAM in the embodiment to start implementing data access. Here, it also may be understood that, the CPU sends a signal that characterizes to implement the data access to the configuration register 131. The configuration register 131 sends the startup information to the searching and matching module 12 based on the signal.

In the implementation mode, the data information successfully matched by the searching and matching module 12 is stored by the data register 132. When the data information is stored in the data register 132, it is instructed by the state register 133 that the CPU may read the data information. Specifically, when the data information is stored in the data register 132, the state register 133 is set into a high level so as to instruct that the CPU presently may read the data information.

Based on another implementation mode of the embodiment, the configuration register 131 includes an attribute register and a startup register.

The attribute register is configured to acquire the attribute information configured by the CPU.

The startup register is configured to acquire the startup information configured by the CPU and send the startup information to the searching and matching module 12.

Specifically, the attribute register is configured to store the configured attribute information. The attribute information includes the attribute parameter(s), and further may include a to-be-accessed RAM identifier and to-be-accessed RAM address range information, etc. The startup register acquires the startup information configured by the CPU, and triggers the device for accessing the RAM in the embodiment to start implementing the data access based on the startup information configured by the CPU.

Based on another implementation mode of the embodiment, the state register 133 includes a single-data acquired state register, configured to instruct the CPU to read the data information by a high level when the data information successfully matched by the searching and matching module is stored to the data register 132.

The state register 133 further includes an all-data acquired state register, configured to instruct that the access to the RAM is ended when it is determined that the access to to-be-accessed data information ends.

Specifically, the searching and matching module 12 matches the data information read by the RAM based on the attribute information in the register module 13, and writes the data information successfully matched into the data register 132. In this process, when there is the data information written into the data register 132, the single-data acquired state register is set into the high level so as to instruct that the CPU may read the data information. When the searching and matching module 12 determines that the address of the to-be-accessed RAM reaches to the end address, that is, after the last piece of data information to be accessed is written into the data register 132 and the CPU reads the last piece of data information, the all-data acquired state register is set into the high level so as to instruct that all to-be-accessed data information has been read and the access procedure is ended.

According to the technical solution of the embodiment of the disclosure, under the condition that the bandwidth of the original interface is not changed, the data information in conformity with the attribute information is matched internally through the device for accessing the RAM, and the data information is stored to the data register in the access device. The CPU only needs to access the register module (specifically, the state register and the data register in the register module) to directly read data in conformity with the attribute information, and the CPU is not required to traverse all data information in the RAM and then judge whether the data information meets the requirement of the attribute information. Therefore, the access time is greatly saved, and the access efficiency to the RAM is increased.

In the embodiment, the register module 13, the searching and matching module 12 and the RAM interface module 11 in the device for accessing the RAM all may be implemented by a Digital Signal Processor (DSP) or a Field-Programmable Gate Array (FPGA) in an actual application.

Embodiment 2

Figure 3:
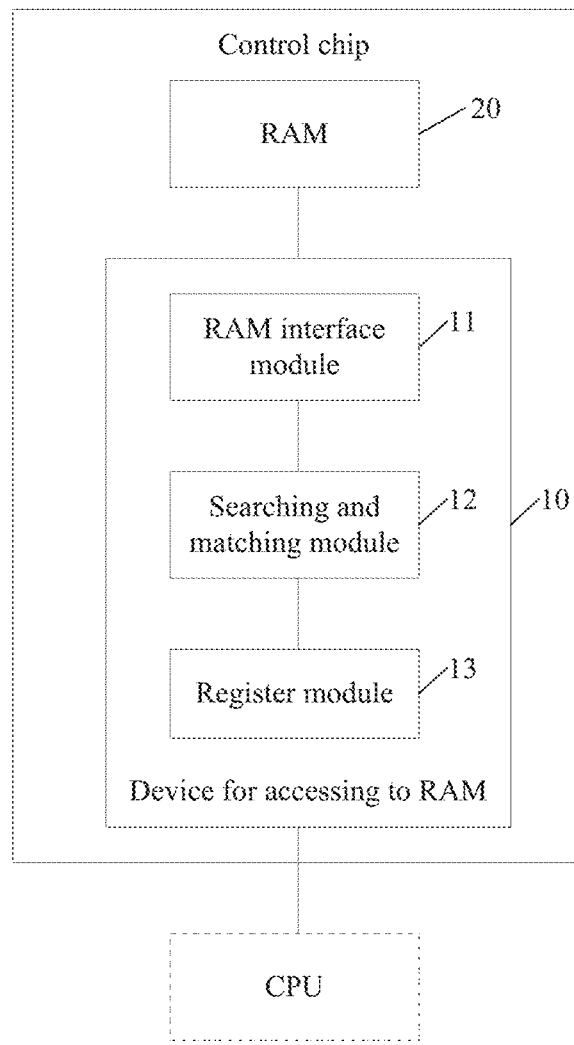
FIG. 3 is a schematic structure diagram of a control chip according to a second embodiment of the disclosure.

Based on the device for accessing the RAM in the first embodiment, the embodiment of the disclosure further provides a control chip. FIG. 3 is a schematic structure diagram of a control chip according to a second embodiment of the disclosure. As shown in FIG. 3, the control chip includes the RAM and the access devices for the RAM.

The RAM is configured to store data information.

The device for accessing the RAM includes the device for accessing the RAM in the first embodiment of the disclosure.

In the embodiment, the control chip specifically may be an ASIC chip. The ASIC chip includes at least one RAM and the device for accessing the RAM in the embodiment of the disclosure. There is an interface with not too wide bandwidth between the device for accessing the RAM and the CPU, and the bandwidth is between 10M and 200M. However, in the conventional technical solutions, the CPU is required to access the RAM in the ASIC via the interface whose bandwidth is not too wide, and the bandwidth is between 10M and 200M. Hence, it may be understood that, the technical solutions of the embodiments of the disclosure are novel technical solutions on the premise of not changing the bandwidth of the original interface.

Specifically, based on the embodiment herein and as shown in FIG. 1 and FIG. 2, the device for accessing the RAM includes a register module 13, a searching and matching module 12 and an RAM interface module 11.

The register module 13 is configured to acquire attribute information and startup information configured by a CPU and send the startup information to the searching and matching module 12, and also is configured to store data information successfully matched by the searching and matching module 12 and instruct the CPU to read the data information.

The searching and matching module 12 is configured to send address information to the RAM interface module 11 according to the startup information, and also is configured to acquire the data information sent by the RAM interface module 11, match the data information based on the attribute information in the register module 13 and send the data information to the register module 13 after matching is successful.

The RAM interface module 11 is configured to read the data information from RAM based on the address information sent by the searching and matching module 12 and send the data information to the searching and matching module 12.

Herein, the register module 13 is configured to acquire the attribute information and the startup information configured by the CPU. The attribute information includes to-be-accessed address range information. The searching and matching module 12 is configured to send the address information to the RAM interface module 11 in sequence from a start address based on the to-be-accessed address range information after receiving the startup information.

Herein, the register module 13 is configured to acquire the attribute information configured by the CPU. The attribute information includes attribute parameter(s). The searching and matching module 12 is configured to match the data information based on the attribute parameter(s) in the register module 13.

In the embodiment, the register module 13 is mainly configured to acquire the attribute information and the startup information a configured by the CPU. The CPU may instruct the device for accessing to the RAM in the embodiment on how to operate by configuring the attribute information, such as configuring the attribute parameter(s) for matching, configuring to-be-accessed RAM identifier(s) (specifically RAM number(s)), and configuring to-be-accessed RAM address range information (including a start address and an end address). In other words, the attribute information may include the attribute parameter(s), the RAM identifier(s) and the RAM address range information, etc. Herein, the to-be-accessed RAM address range falls into address range of the RAM. Namely, when the address range of the RAM is greater or equal to 0 and is smaller than or equal to N (N is a positive integer), the to-be-accessed RAM address range is greater than or equal to a and is smaller than or equal to b, wherein a is greater than or equal to 0, b is smaller than or equal to N, and both a and b are the positive integer. It may be understood that, the CPU configures the to-be-accessed address range information according to the RAM address range information. Of course, the to-be-accessed address range information is selectable, that is, the attribute information configured by the CPU acquired by the register module 13 also may exclude the to-be-accessed address range information. When the attribute information excludes the to-be-accessed address range information, the searching and matching module sends the address information to the RAM interface module in sequence from an address 0 of the RAM to an address n (n characterizes a depth of the RAM) of the RAM. Furthermore, the CPU further may configure the startup information to instruct the device for accessing to the RAM in the embodiment to start implementing data access. Here, it also may be understood that, the CPU sends a signal that characterizes to implement the data access to the register module 13. The register module 13 starts to implement a data access operation based on the signal. The register module 13 is also configured to acquire the data information successfully matched by the searching and matching module 12 and instruct the CPU that it may implement data reading.

The searching and matching module 12 is configured to control addresses of the to-be-accessed RAM. Specifically, the searching and matching module 12 controls the RAM interface module 11 to read the data information from the corresponding RAM in sequence from the start address in the address range information based on the attribute information in the register module 13, specifically based on the address range information in the attribute information. After the data information of one piece of address information is read completely, the searching and matching module 12 enables an address value of the address information to add 1 to generate new address information, and sends the new address information to the RAM interface module 11 to continuously read the data information from the RAM until the data information corresponding to all address information in the address range information is read completely.

The RAM interface module 11 is mainly configured to access the RAM, access the RAM using the address information instructed by the searching and matching module 12 to acquire corresponding data information, and send the data information to the searching and matching module 12 to match.

In the embodiment, the searching and matching module 12 matches the data information based on the attribute information of the register module 13. Specifically, the searching and matching module 12 matches the data information according to a preset matching rule based on the attribute parameter in the register module 13. The preset matching rule includes whether to be equal to, smaller than or greater than the attribute parameter. The preset matching rule further may include whether to equal to a preset threshold value after being operated according to a preset operational rule based on the attribute parameter.

Specifically, taken PORT=8 as an example of the attribute parameter, when the preset rule indicates to be equal to the attribute parameter, the PORT values of the matched data information are 8. When the preset rule indicates to be smaller than the attribute parameters, the PORT values of the matched data information are smaller than 8. Accordingly, when the preset rule indicates to be greater than the attribute parameter, the PORT values of the matched data information are greater than 8. When the preset rule indicates to be equal to the preset threshold value after being operated according to the preset operational rule based on the attribute parameter, it is assumed that the preset operational rule is a subtraction operation and the preset threshold value is 3, the PORT values of the matched data information are 5 or 11.

As an implementation mode, as shown in FIG. 2, in the device for accessing the RAM, the register module 13 includes a configuration register 131, a data register 132 and a state register 133.

The configuration register 131 is configured to acquire the attribute information and the startup information configured by the CPU and send the startup information to the searching and matching module 12.

The data register 132 is configured to store the data information successfully matched by the searching and matching module 12.

The state register 133 is configured to instruct the CPU to read the data information.

Specifically, the CPU may instruct the device for accessing the RAM in the embodiment on how to operate by configuring the attribute information, such as configuring an attribute parameter for matching, configuring a to-be-accessed RAM identifier (specifically RAM number), and configuring to-be-accessed RAM address range information (including a start address and an end address). In other words, the attribute information may include the attribute parameter, the RAM identifier and the RAM address range information, etc. In the implementation mode, the configuration register 141 is used to store the attribute information. On the other hand, the CPU further may configure the startup information to instruct the device for accessing the RAM in the embodiment to start implementing data access. Here, it also may be understood that, the CPU sends a signal that characterizes the data access to the configuration register 131. The configuration register 131 sends the startup information to the searching and matching module 12 based on the signal.

In the implementation mode, the data information successfully matched by the searching and matching module 12 is stored by the data register 132. When the data information is stored in the data register 132, it is instructed by the state register 133 that the CPU may read the data information. Specifically, when the data information is stored in the data register 132, the state register 133 is set into a high level so as to instruct that the CPU presently may read the data information.

Based on another implementation mode of the embodiment, the configuration register 131 includes an attribute register and a startup register.

The attribute register is configured to acquire the attribute information configured by the CPU.

The startup register is configured to acquire the startup information configured by the CPU and send the startup information to the searching and matching module 12.

Specifically, the attribute register is configured to store the configured attribute information. The attribute information includes the attribute parameter(s), and further may include to-be-accessed RAM identifier(s), and to-be-accessed RAM address range information, etc. The startup register acquires the startup information configured by the CPU, and triggers the device for accessing the RAM in the embodiment to start implementing the data access based on the startup information about the configuration of the CPU.

Based on another implementation mode of the embodiment, the state register 133 includes a single-data acquired state register, configured to instruct the CPU to read the data information by a high level when the data information successfully matched by the searching and matching module is stored to the data register 132.

The state register 133 further includes an all-data acquired state register, configured to instruct that the access to the RAM is ended when it is determined that the access to to-be-accessed data information ends.

Specifically, the searching and matching module 12 matches the data information read by the RAM based on the attribute information in the register module 13, and writes the data information successfully matched into the data register 132. In this process, when there is the data information written into the data register 132, the single-data acquired state register is set into the high level so as to instruct that the CPU may read the data information. When the searching and matching module 12 determines that the addresses of the to-be-accessed RAM reach to the end address, that is, after the last piece of data information to be accessed is written into the data register 132 and the CPU reads the last piece of data information, the all-data acquired state register is set into the high level so as to instruct that all to-be-accessed data information has been read and the access procedure is ended.

To sum up, according to the embodiments of the disclosure, under the condition that the bandwidth of the original interface is not changed, the data information in conformity with the attribute information is matched internally through the device for accessing the RAM, and the data information is stored to the data register in the access device. The CPU only needs to access the register module (specifically, the state register and the data register in the register module) to directly read data in conformity with the attribute information, and the CPU is not required to traverse all data information in the RAM and then judge whether the data information meets the requirement of the attribute information. Therefore, with the novel way for access to the RAM, the access time is greatly saved, and the access efficiency to the RAM is increased. Furthermore, the device for accessing the RAM in the embodiment may be implemented by a logic circuit in the control chip (specifically, it may be the ASIC chip), and the CPU is not required to match and screen the data information internally, so the access time is saved, and the access efficiency to the RAM is increased.

Embodiment 3

Figure 4:
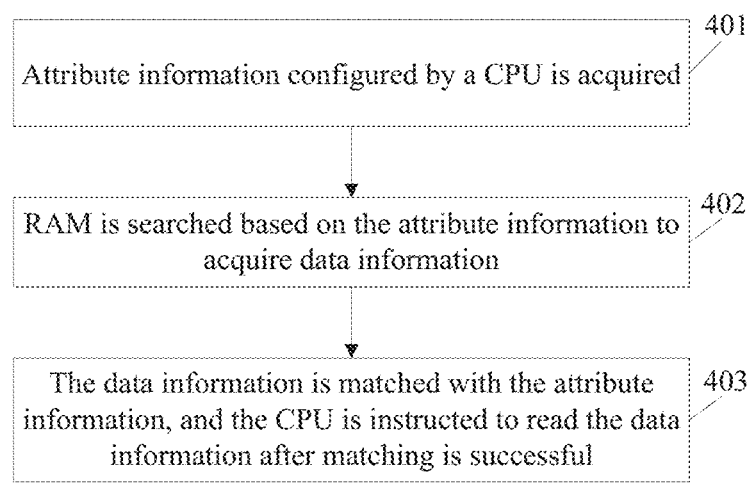
FIG. 4 is a flowchart of a method for accessing to a RAM according to a third embodiment of the disclosure.

Based on the first embodiment or the second embodiment, the embodiment of the disclosure further provides a method for accessing to the RAM. FIG. 4 is a flowchart of a method for accessing to a RAM according to a third embodiment of the disclosure. As shown in FIG. 4, the method comprises the following steps.

In step 401, attribute information and start information configured by a CPU are acquired.

In step 402, the RAM is searched based on the startup information and the attribute information to acquire data information.

In step 403, the data information is matched with the attribute information, and the CPU is instructed to read the data information after matching is successful.

Specifically, the attribute information includes to-be-accessed address range information and an attribute parameter.

The operation that the RAM is searched based on the startup information and the attribute information to acquire the data information includes that the RAM is searched in sequence from a start address based on the address range information in the attribute information when the startup information configured by the CPU is received.

Accordingly, the operation that the data information is matched with the attribute information includes that the data information is matched with the attribute parameter in the attribute information.

In the embodiment, the method for accessing to the RAM is applied to the device for accessing to the RAM. That is to say, an executive subject for the step 401 to the step 403 is the device for accessing to the RAM. The device for accessing to the RAM may be specifically referred to the description in the first embodiment or the second embodiment and will not be repeated herein.

Specifically, in the step 401, the operation that the attribute information configured by the CPU is acquired includes that a register module acquires the attribute information and the startup information configured by the CPU. In the step 402, the operation that the RAM is searched based on the attribute information and the startup information to acquire the data information includes that a searching and matching module sends address information to an RAM interface module based on the startup information; and the RAM interface module reads data information from the RAM based on the address information and sends the data information to the searching and matching module. In the step 403, the operation that the data information is matched with the attribute information and the CPU is instructed to read the data information after the matching is successful includes that the searching and matching module matches the data information based on the attribute information in the register module and sends the data information to the register module after the matching is successful; and the register module instructs the CPU to read the data information.

The method for accessing to the RAM in the embodiment of the disclosure will be described below in detail with reference to the specific embodiment based on the device for accessing the RAM shown in FIG. 2.

In step 1, an attribute register receives attribute information and startup information configured by a CPU. The attribute information includes one or more RAM numbers (RAM-ID(s)), and to-be-accessed start address and end address. A startup register sends a signal after receiving the startup information and triggers to start implementing an access process for the RAM.

In step 2, a searching and matching module sends the start address to an RAM interface module from the start address after receiving the signal of the startup register.

In step 3, the RAM interface module accesses the RAM according to the RAM number (RAM-ID), reads a data content corresponding to the start address from the RAM and sends the data content to the searching and matching module. The searching and matching module matches the information in the data content according to the attribute information in the attribute register. When the matching is not successful, it enables an address value to add 1 to generate a new address and continuously sends the new address to the RAM interface module to read the data information until the read data information is matched successfully. When the matching is successful, it sends the data content to a data register and sets a single-data acquired state register into a high level so as to instruct that the CPU may read the data information and wait the CPU to read out the data information from the data register.

In step 4, when the CPU reads the data information in the data register, the searching and matching module continuously increases the address value (add 1 to the address value) and continuously sends the new address to the RAM interface module to read the data information, and the searching and matching module matches the read data content. After the CPU reads the data in the data register completely, the single-data acquired state register is set into a low level so as to instruct that the CPU presently has no data information to be read. The searching and matching module sends the data information successfully matched to the data register.

In step 5, the searching and matching module judges whether the address value reaches to an end address, thereby determining whether all data information successfully matched is read by the CPU. When the address value reaches to the end address, an all-data acquired state register is set into a high level so as to indicate that all data information has been read and to end the access operation to the RAM.

Embodiment 4

Figure 5:
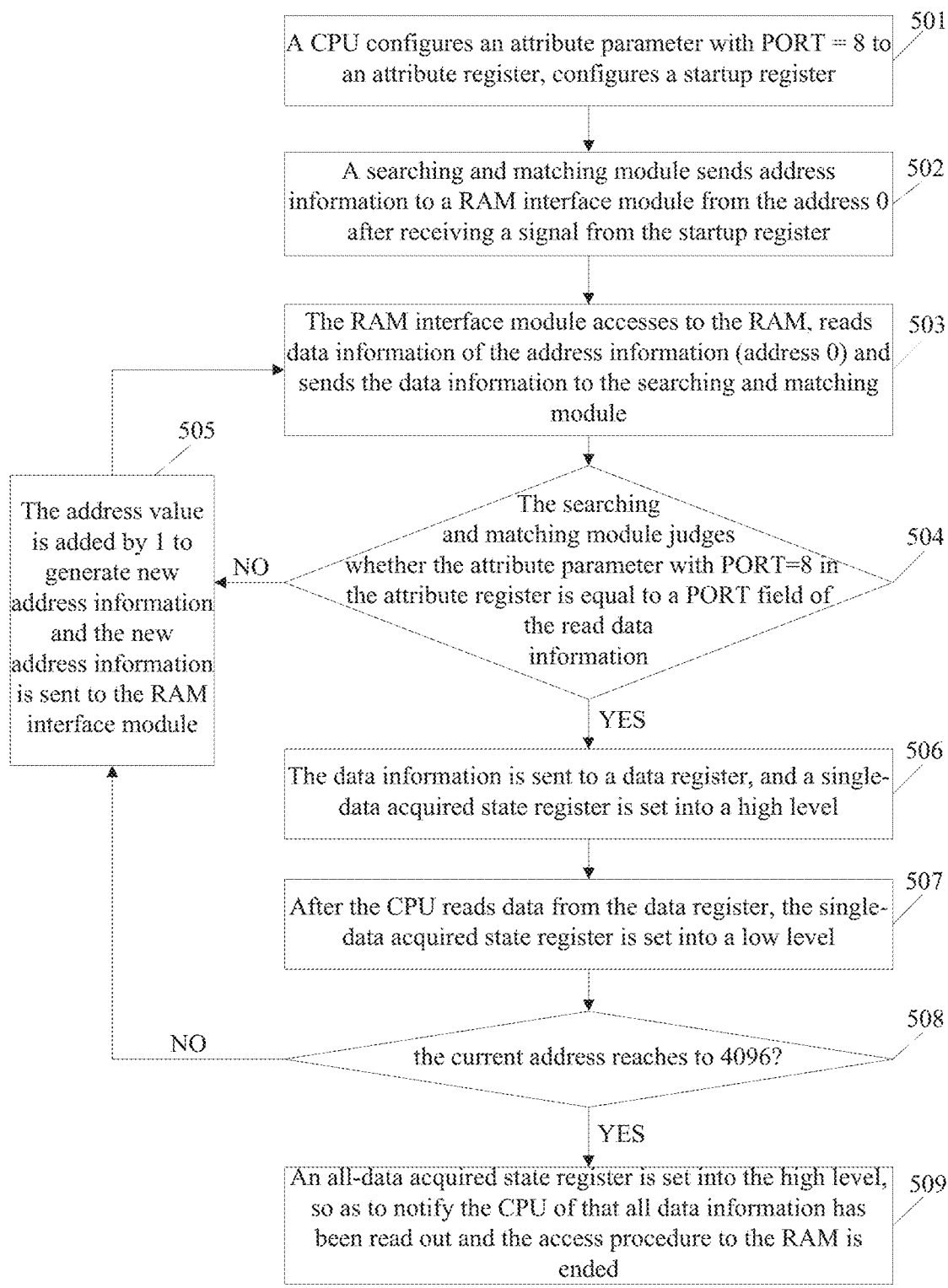
FIG. 5 is a flowchart of a method for accessing to a RAM according to a fourth embodiment of the disclosure.

The embodiment of the disclosure further provides a method for accessing to the RAM. The embodiment will be described in detail by a specific application. In the embodiment, it is assumed that the control chip is the ASIC chip. The ASIC chip includes one RAM used to store an MAC address table. The depth of the RAM is 4096. The format of the RAM to store the data is as follows: {VLAN [11: 0], MAC [47: 0], PORT [11: 0]}. It is assumed that the PORT value of the data information to be read is 8. FIG. 5 is a flowchart of a method for accessing to a RAM according to a fourth embodiment of the disclosure. As shown in FIG. 5, the method comprises the following steps.

In step 501, a CPU configures an attribute parameter with PORT=8 into an attribute register, configures a startup register and triggers to start implementing an access process to the RAM.

In step 502, a searching and matching module sends address information (namely an address 0) to an RAM interface module from the address 0 after receiving a signal from the startup register.

In the embodiment, since the attribute information configured by the CPU does not include a start address and an end address, a default access address range in the embodiment includes all addresses of the RAM, namely, from the address 0 to the address 4096.

In step 503, the RAM interface module accesses to the RAM, reads data information of the address information (address 0) and sends the data information to the searching and matching module.

In step 504, the searching and matching module determines whether the attribute parameter with PORT=8 in the attribute register is equal to a PORT field of the read data information or not. If no, the step 505 is performed, namely, the searching and matching module enables the address value to add 1 to generate new address information and sends the address information to the RAM interface module. Furthermore, the step 503 is further performed again until the matching is successful. If the attribute parameter with PORT=8 in the attribute register is equal to a PORT field of the read data information, the step 506 is performed.

In step 506, the data information is sent to a data register, and a single-data acquired state register is set into a high level so as to instruct that the CPU may read the data information and wait the CPU to read out the data information from the data register. Further, when the CPU reads out the data information from the data register, the single-data acquired state register is set into a low level.

In step 507, after the CPU reads data from the data register, the single-data acquired state register is set into the low level.

In step 508, when the CPU reads the data in the data register, the searching and matching module determines whether the current address reaches to 4096 or not. If the current address does not reach to 4096, the step 503 is performed, namely, the searching and matching module enables the address value to add 1 to generate new address information and sends the new address information to the RAM interface module, and the step 503 is further performed again. If the current address reaches to 4096, the step 509 is performed.

In step 509, an all-data acquired state register is set into the high level, so as to notify the CPU of that all data information has been read out and the access procedure to the RAM is ended.

The embodiments of the disclosure further provide a storage medium. A computer program is stored in the storage medium. The computer program is configured to implement the method for accessing the RAM in the foregoing embodiments.

In the several embodiments provided in the disclosure, it should be understood that the devices and methods disclosed can be implemented in other ways. The device embodiments described above are merely exemplary. For example, the division of the elements is merely a division based on logic functions, and in practice, there are other division ways. For example, some of the elements or components may be combined or integrated into other system, or some features may be omitted or unexecuted. Moreover, coupling or direct coupling or communication connection between the components illustrated or discussed herein may be indirect coupling or communication connection between devices or elements by some interfaces or may be electric connection, mechanical connection or the other forms of connection.

The elements described as separate components may be or may be not physically separated, and the components illustrated as elements may be or may be not physical elements, i.e., they may be located at one place or distributed in a plurality of network elements. Moreover, some of or all the elements may be selected according to actual demands to implement the purpose of the embodiments of the disclosure.

In addition, the functional elements involved in the embodiments of the disclosure may be all integrated into a processing element or each of the elements may be act as a unit separately, or two or more than two of these elements may be integrated into one unit; the integrated element described above may be implemented in the form of hardware or may be implemented in the form of hardware plus software function elements.

It should be understood by those ordinary skilled in the art that all or some of the steps of the foregoing method embodiments can be implemented by program instruction related hardware. The program described above may be stored in a computer-readable storage medium. The program, when executed, executes the steps of the method embodiments described above. The storage medium described above includes a mobile hard disk drive, a Read-Only Memory (ROM), a Random Access Memory (RAM), a disk, a compact disc or another medium capable of storing program codes.

Alternatively, if being implemented in form of a software function module and sold or used as an independent product, the integrated elements of the disclosure may be stored in a computer-readable storage medium. Based on such an understanding, the technical solutions of the embodiments of the disclosure substantially or a part with contributions to the conventional art may be embodied in form of software product, and the computer software product is stored in a storage medium, including a plurality of instructions arranged to enable a computer (which may be a personal computer, a server, a network device or the like) to execute all or part of the method in each of the embodiments of the disclosure. The preceding storage medium includes various media capable of storing program codes such as a mobile storage device, an ROM, an RAM, a magnetic disk or a compact disc.

The above description is only specific embodiments of the disclosure and the protection scope of the disclosure is not limited to this. It may be readily conceivable for those skilled in the art to have changes or modifications in the technical scope of the disclosure, and all of the changes or modifications should fall within the protection scope of the disclosure. Therefore, the protection scope of the disclosure should be accordance with the protection scope of the appended claims.

INDUSTRY APPLICABILITY

According to the disclosure, the data information in conformity with the attribute information is matched internally through the device for accessing the RAM, and the data information is stored to the data register in the access device. The CPU only needs to access the register module to directly read data in conformity with the attribute information, and the CPU is not required to traverse all data information in the RAM and then judge whether the data information meets the requirement of the attribute information. Therefore, the access time is greatly saved, and the access efficiency to the RAM is increased.

The invention claimed is:

1. A device for accessing to a Random Access Memory (RAM), comprising: a processor; and a memory for storing instructions executed by the processor;

wherein the processor is configured to:

acquire attribute information and startup information configured by a Central Processing Unit (CPU), send the startup information, store data information successfully matched and instruct the CPU to read the data information, wherein the attribute information comprises an attribute parameter and to-be-accessed RAM address range configured according to RAM address range, and when the RAM address range is greater or equal to 0 and is smaller than or equal to N, the to-be-accessed RAM address range is greater than or equal to a and is smaller than or equal to b, wherein a is greater than or equal to 0, b is smaller than or equal to N, and all of N and a and b are the positive integer;

send address information in sequence from a start address to an end address based on the to-be-accessed RAM address range after receiving the startup information according to the startup information, acquire the data information, match the data information based on the attribute information according to a preset matching rule, and send the data information after matching is successful, wherein the preset matching rule includes whether to be equal to, smaller than or greater than the attribute parameter, or whether to be equal to a preset threshold value after being operated according to a preset operational rule based on the attribute parameter; and read the data information from the RAM based on the address information and send the data information.

2. The device according to claim 1, wherein the processor is further configured to be capable of executing the stored program instructions to acquire the attribute information configured by the CPU.

3. The device according to claim 1, wherein the processor is further configured to be capable of executing the stored program instructions to:

acquire the attribute information and the startup information configured by the CPU and send the startup information;

store the successfully matched data information; and instruct the CPU to read the data information.

4. The device according to claim 3, wherein the processor is further configured to be capable of executing the stored program instructions to:

acquire the attribute information configured by the CPU; and acquire the startup information configured by the CPU and send the startup information.

5. The device according to claim 3, wherein the processor is further configured to be capable of executing the stored program instructions to instruct the CPU to read the data information by a high level when the data information successfully matched is stored.

6. The device according to claim 5, wherein the processor is further configured to be capable of executing the stored program instructions to instruct that the access to the RAM is ended when it is determined that the access to to-be-accessed data information is ended.

7. A method for accessing to a Random Access Memory (RAM), comprising:

acquiring attribute information and startup information configured by a Central Processing Unit (CPU), the attribute information comprising an attribute parameter and to-be-accessed address range configured according to RAM address range, wherein when the RAM address range is greater or equal to 0 and is smaller than or equal to N, the to-be-accessed RAM address range is greater than or equal to a and is smaller than or equal to b, wherein a is greater than or equal to 0, b is smaller than or equal to N, and all of N and a and b are the positive integer;

searching for the RAM based on the startup information and the attribute information to acquire data information; and matching the data information with the attribute information according to a preset matching rule and instructing the CPU to read the data information after matching is successful, wherein the preset matching rule includes whether to be equal to, smaller than or greater than the attribute parameter, or whether to be equal to a preset threshold value after being operated according to a preset operational rule based on the attribute parameter;

wherein searching for the RAM based on the startup information and the attribute information to acquire the data information comprises: searching for the RAM in sequence from a start address to an end address based on the address range information in the attribute information when the startup information configured by the CPU is received.

8. The method according to claim 7, wherein said matching the data information with the attribute information comprises: matching the data information with the attribute parameter in the attribute information.

9. A control chip, comprising a Random-Access Memory (RAM) and a device for accessing to the RAM, wherein the RAM is configured to store data information; and the device comprises: a processor and a memory for storing instructions executed by the processor, wherein the processor is configured to:

acquire attribute information and startup information configured by a Central Processing Unit (CPU), send the startup information, store successfully matched data information and instruct the CPU to read the data information, wherein the attribute information comprises an attribute parameter and to-be-accessed RAM address range configured according to RAM address range, and when the RAM address range is greater or equal to 0 and is smaller than or equal to N, the to-be-accessed RAM address range is greater than or equal to a and is smaller than or equal to b, wherein a is greater than or equal to 0, b is smaller than or equal to N, and all of N and a and b are the positive integer;

send address information according to the startup information, acquire the data information, match the data information based on the attribute information according to a preset matching rule and send the data information after matching is successful, wherein the preset matching rule includes whether to be equal to, smaller than or greater than the attribute parameter, or whether to be equal to a preset threshold value after being operated according to a preset operational rule based on the attribute parameter; and read the data information from the RAM based on the address information and send the data information;

wherein searching for the RAM based on the startup information and the attribute information to acquire the data information comprises: searching for the RAM in sequence from a start address to an end address based on the address range information in the attribute information when the startup information configured by the CPU is received.

* * * * *